April 25, 1933. I. H. BEDDOE 1,905,991
EXPANSION COMPENSATOR
Filed May 23, 1932
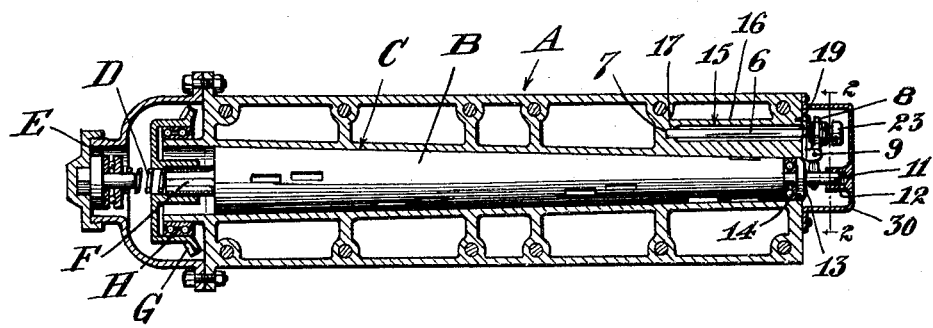
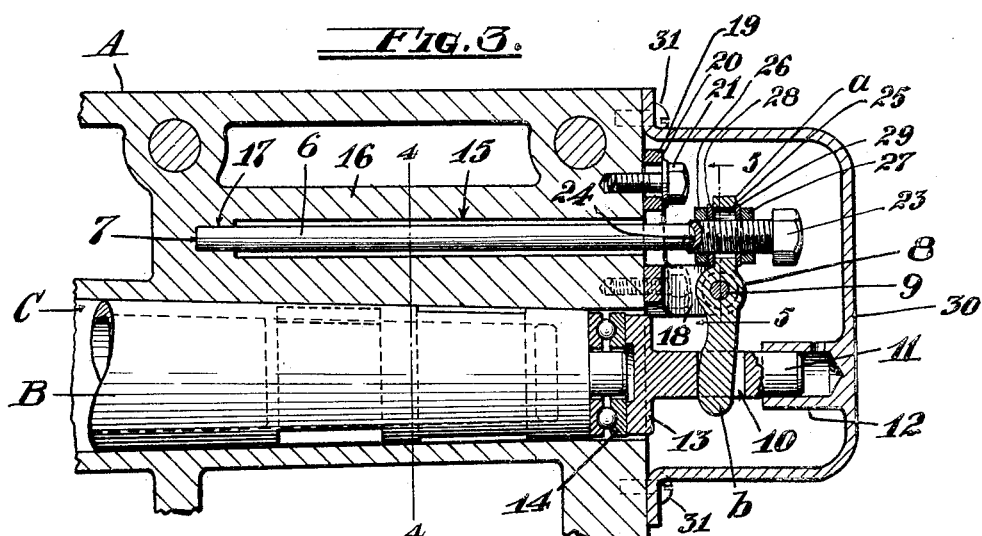
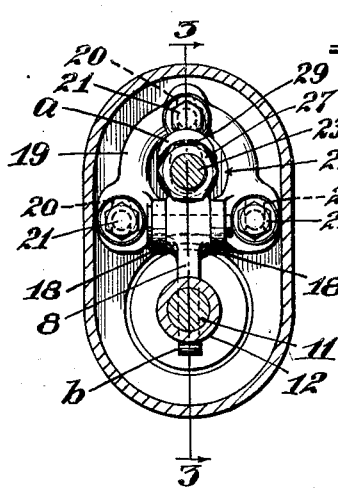
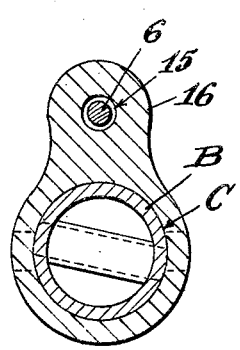
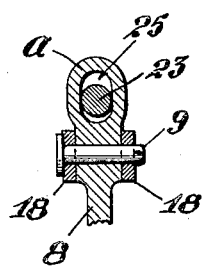
Inventor
Ira H. Beddoe Patented Apr. 25, 1933

1,905,991

UNITED STATES PATENT OFFICE

IRA H. BEDDOE, OF VENICE, CALIFORNIA

EXPANSION COMPENSATOR

Application filed May 23, 1932. Serial No. 612,981.

This invention relates to a device for compensating for the expansion of moveable elements in mechanisms where such elements are subjected to the action of heat, such as in the case of valves, shafts, ignition control devices and other relatively moveable parts of internal combustion engines and the like; the invention more particularly pertaining to the type of expansion compensator set forth in the application for United States Letters Patent, Serial No. 506,464 filed by J. B. White January 3, 1931.

In devices of this character as heretofore employed, an expansible compensator element is interposed between an abutment and the end of a longitudinally moveable machine element in such manner that when both elements are subjected to the action of heat, longitudinal expansion of the compensator element will directly effect longitudinal shifting of the machine element. To render this device operative it is necessary to closely associate the expansible compensator element and the machine element, and also to employ a material in the expansible compensator element having a greater coefficient of expansion than that of the machine element to be controlled.

The present invention contemplates the employment of an expansible compensator element which may have a corresponding, or more or less, coefficient of expansion than that of the machine element to be controlled, and the invention has as its primary object the provision of a means whereby the movement afforded by expansion of the compensator element may be caused to effect any desired longitudinal shifting movement of the machine element, and whereby the shifting movement of the machine element may be varied relative to and is not dependent upon the degree or coefficient of expansion of the compensator element.

Another object is to provide an expansion compensator which is so cooperatively related to the machine element that it may be placed either in juxtaposition therewith or remote therefrom, and whereby operation of the compensator may be effected either by heat proximate to or remote from the machine element to be controlled.

With the foregoing objects in view, together with such other objects and advantages as may subsequently appear, the invention resides in the parts and in the combination, construction and arrangement of parts hereinafter described and claimed, and illustrated by way of example in the accompanying drawing in which the invention is shown as applied to a rotary valve in an internal combustion engine, and in which:

Fig. 1 is a horizontal section of an engine head showing the valve and the expansion compensator in plan;

Fig. 2 is a section and elevation taken on the line 2—2 of Fig. 1;

Fig. 3 is a detail in section taken on the line 3—3 of Fig. 2, with parts shown in elevation;

Fig. 4 is a detail in section as seen on the line 4—4 of Fig. 3;

Fig. 5 is a detail in section taken on the line 5—5 of Fig. 3.

Referring to the drawing more specifically, A indicates generally an engine head which is fitted with a tapered rotary valve B revolubly seated in a tapered bore C formed in the engine head, and which valve is adapted to be shifted longitudinally relative to its seat, being normally maintained in its seated position by a spring D which bears between an end thrust bearing E and a stem F projecting axially from the enlarged end of the valve.

The valve may be rotated in any desired manner, being here shown as fitted with a driving gear G mounted on a bearing H carried by the engine head and which gear is splined on the stem F, whereby rotation of the gear will effect turning of the valve B and yet permit longitudinal movement of the valve relatively to the gear. The valve B constitutes a machine element which is subject to the action of heat such as to cause it to expand laterally thereby causing it to bind in its encompassing bearing or seat since it is normally mounted in close fitting sliding contact therewith.

Manifestly, inasmuch as the valve or element is longitudinally tapered or frustoconical, lateral expansion thereof may be compensated for by shifting it lengthwise in an outward direction relative to its seat and yet maintain a close sliding fit between the valve and seat if such shifting of the valve is of a distance properly proportioned to the extent of its lateral expansion relative to the encompassing walls constituting the seat.

In order to effect this requisite longitudinal movement of the valve, I employ an expansible element 6 which is here shown as comprising an elongated metallic bar adapted to expand longitudinally as well as transversely, on being heated, which bar is mounted with one end thereof retained against an abutment 7 and with its other end terminating adjacent one end $a$ of a lever 8, pivoted at 9 and having its other end $b$ arranged to exert a longitudinal thrust against the small end of the valve B on the lever being actuated by expansion of the bar 6.

The end $b$ of the lever 8 is here shown as extending through a slot 10 formed in a slide bar 11 one end of which is slidably supported in a guide socket 12 and the other end of which is formed with a head 13 disposed adjacent the inner reduced end of the valve B between which head 13 and the valve B is interposed an end thrust bearing 14.

The bar 6 is here shown as arranged in a bore 15 formed in a wall 16 constituting a portion of the engine head A which bore 15 is of a diameter larger than that of the bar 6 to afford lateral clearance around the latter, and the inner end of which bore is formed with a socket 17 in which the inner end of the bar 6 is engaged and the bottom of which socket constitutes the abutment 7.

As a means for enabling adjustment of the lever 8 to vary the effective relative length of its end portions $a$ and $b$, the pivot 9 constituting the fulcrum of the lever is mounted on the members 18 of a yoke carried on a plate 19 adjustably mounted on the end of the engine head A to permit the plate being disposed in various positions in transverse relation to the bar 6. The plate 19 is formed with a series of elongated slots 20 through which extend the shanks of stud bolts 21 screwed into the engine head and arranged so that the heads of said bolts will serve to clamp the plate 19 against movement relative to the engine head.

The outer end of the bar 6 projects through an opening 22 in the plate 19 and abuts against the inner end of an adjustment screw 23 carried on the end portion $a$ of the lever 8. The outer end of the bar 6 is rounded, as indicated at 24, and seats in a socket conforming thereto formed on the inner end of the screw 23.

The end portion $a$ of the lever 8 is formed with an elongated slot 25 through which the shank of the screw 23 extends, and mounted on opposite sides of the end portion $a$ are threaded nuts 26 and 27 engaged by the screw 23 to afford a bearing for the latter. Lock washers 28 and 29 are interposed between the nuts 26 and 27 and the end portion $a$ of the lever 8. By thus mounting the set screw 23 it may be adjusted longitudinally through the lever 8 and may also be shifted lengthwise of the latter to position the screw in alignment with the bar 6 according to the longitudinal position of the lever 8 assumed on shifting the plate 19.

The lever 8 and its connection are here shown as encased within a housing 30 detachably secured to the end of the engine head A as by screws 31, and on which housing the socket bearing 12 is carried.

The expansion bar 6 by reason of being mounted within and connected to the engine head is adapted to absorb heat from the latter on operation of the engine, both by conduction through its contact with the engine head in the socket 17 and also by radiation from the walls of the bore 15, and accordingly is subject to longitudinal expansion and contraction according to variations in temperature of the engine head.

In the operation of the invention, elongation of the bar 6, under the action of heat will effect outward movement of the end portion $a$ of the lever 8 and inward movement of the end portion $b$ of the latter, thereby causing the slide bar 11 to advance and act through the end thrust bearing 14 to shift the valve B outwardly in opposition to the spring D.

The lever 8 is positioned so that the leverage or relative movement of the end portions thereof will be so related to the longitudinal elongation of the bar 6 as to effect such longitudinal shifting of the valve B as to prevent binding of the latter in its seat due to the expansion of the valve and its encompassing walls.

On contraction of the bar 6 occurring on reduction of temperature of the engine walls the pressure exerted by the expansion bar through the lever 8 on the inner end of the valve B will be reduced, whereupon the spring D will advance the valve B and thereby effect outward movement of the end portion $b$ of the lever 8 so that the screw on the end $a$ of the lever will follow the contracting bar 6.

The bar 6 with its associated lever 8 thus constitutes a compensator, with the bar 6 serving as an expansible compensator element.

While I have shown and described the compensator element or bar 6 as disposed contiguous the valve B, it manifestly may be located at any convenient point and position where it will be subject to the action of heat, since its action on the valve B is transmitted to the latter through a lever, which lever may also be formed and arranged as occasion may require, and while I have shown the invention as applied to an engine valve of the rotary type, it may obviously be employed in connection with various other devices where compensation for expansion thereof is desirable, and accordingly I do not limit myself to the exact details in construction and arrangement shown, but may employ such changes and modifications in the parts and in their arrangement as come within the meaning and scope of the appended claims.

I claim:

1. In an expansion compensator, the combination with a seated shiftable machine element subject to binding under the action of heat, of an expansion element adapted to be elongated under the action of heat, and a lever interposed between said elements arranged to effect shifting of said machine element on elongation of said expansion element.

2. The structure called for in claim 1, including means for adjusting the lever to vary its action.

3. In an expansion compensator, the combination of a seated shiftable machine element, an expansion element adapted to be elongated under the action of heat, said expansion element located apart from said machine element, a lever having one end thereof arranged to be actuated by elongation of said expansion element and the other end arranged to effect shifting of said machine element, and a shiftable fulcrum for said lever.

4. In an expansion compensator, a lever, a machine element adapted to be shifted by said lever, heat responsive means for actuating said lever in one direction, and tension means yieldably resisting shifting of said machine element under the urge of said lever.

5. In an expansion compensator, a heat responsive expansible element, a lever having one end thereof arranged to be acted on by said element, a shiftable machine element, means affording a connection between said lever and said machine element for effecting shifting of said machine element on operation of said lever, and an end thrust bearing included in said last named means.

6. The combination of a longitudinally tapered rotary machine element, a seat therefor, a spring for maintaining said element against said seat, an end thrust bearing at the reduced end of said element, a slide bar abutting against said bearing, a lever arranged with one end thereof operatively engaging said slide bar, a heat responsive expansible bar having one end thereof arranged on elongation of said element to actuate said lever, and an abutment against which the other end of said bar seats.

7. The combination of a longitudinally tapered rotary machine element, a seat therefor, a spring for maintaining said element against said seat, an end thrust bearing at the reduced end of said element, a slide bar abutting against said bearing, a lever arranged with one end thereof operatively engaging said slide bar, a heat responsive expansible bar having one end thereof arranged on elongation of said element to actuate said lever, an abutment against which the other end of said bar seats, and a wall encompassing said bar in spaced relation thereto adapted to radiate heat to said bar.

8. The combination of a longitudinally tapered rotary machine element, a seat therefor, a spring for maintaining said element against said seat, an end thrust bearing at the reduced end of said element, a slide bar abutting against said bearing, a lever arranged with one end thereof operatively engaging said slide bar, a heat responsive expansible bar having one end thereof arranged on elongation of said element to actuate said lever, an abutment against which the other end of said bar seats, and a shiftable fulcrum for said lever.

9. The combination of a longitudinally tapered rotary machine element, a seat therefor, a spring for maintaining said element against said seat, an end thrust bearing at the reduced end of said element, a slide bar abutting against said bearing, a lever arranged with one end thereof operatively engaging said slide bar, a heat responsive expansible bar having one end thereof arranged on elongation of said element to actuate said lever, a screw carried by said lever against which said bar abuts, and an abutment against which the other end of said bar seats.

10. The combination of a longitudinally tapered rotary machine element, a seat therefor, a spring for maintaining said element against said seat, an end thrust bearing at the reduced end of said element, a slide bar abutting against said bearing, a lever arranged with one end thereof operatively engaging said slide bar, a heat responsive expansible bar having one end thereof arranged on elongation of said element to actuate said lever, a screw carried by said lever against which one end of said bar abuts, said screw being shiftable longitudinally of said lever, means for shifting the fulcrum of said lever, and an abutment against which the other end of said bar seats.

IRA H. BEDDOE.